United States Patent [19]

Near et al.

[11] Patent Number: 5,338,765

[45] Date of Patent: Aug. 16, 1994

[54] METHOD OF AND APPARATUS FOR CONTINUOUSLY FOAMING A POLYIMIDE POWDER

[75] Inventors: Daniel E. Near, Littleton; Royce M. Feagans, Morrison; Ward T. Hobert, Littleton, all of Colo.

[73] Assignee: Schuller International, Inc., Denver, Colo.

[21] Appl. No.: 158,070

[22] Filed: Nov. 23, 1993

[51] Int. Cl.$^5$ .............. B29C 35/00; C08J 9/02
[52] U.S. Cl. ............... 521/50.5; 264/26; 264/50; 264/53; 521/77; 521/183; 521/184; 521/185; 521/189; 521/915
[58] Field of Search ............ 521/184, 185, 189, 183, 521/915, 77; 264/26, 50, 53

[56] References Cited

U.S. PATENT DOCUMENTS

| | | |
|---|---|---|
| 4,305,796 | 12/1981 | Gagliani et al. . |
| 4,780,167 | 10/1988 | Hill . |
| 4,804,504 | 2/1989 | Lee et al. ............ 521/184 |
| 4,822,537 | 4/1989 | Lanier et al. ........ 521/184 |
| 4,855,331 | 8/1989 | Lanier et al. . |
| 4,877,563 | 10/1989 | Broemmelsiek et al. ...... 521/184 |
| 4,897,432 | 1/1990 | Lee et al. ............ 521/184 |
| 4,900,761 | 2/1990 | Lee . |
| 4,900,762 | 2/1990 | Broemmelsiek et al. ...... 521/184 |
| 4,980,387 | 12/1990 | Wernsing et al. . |
| 4,980,389 | 12/1990 | Hill et al. . |
| 4,990,543 | 2/1991 | Wernsing et al. . |

Primary Examiner—Morton Foelak
Attorney, Agent, or Firm—Cornelius P. Quinn

[57] ABSTRACT

A method of and apparatus for continuously foaming a polyimide prepolymer powder which is not susceptible to heating by microwave energy utilize a preheated conveyor belt to heat the powder in contact with and adjacent the surface of the conveyor belt to commence the reaction and foaming of the powder as it enters an oven which further heats the powder by convection and infrared radiation to form a continuous foam bun. The conveyor belt is cooled as it exits the oven to cool a bottom surface of the foam product to enable the foam product to be removed from the conveyor before interior portions of the foam product have cooled. Foam adhering to the conveyor belt, after the product has been removed, is cleaned from the conveyor belt, collected and mixed with and used as a filler in the prepolymer powder used in the process. In addition the mass of the powder entering the oven and the density and degree of cure of the foam bun exiting the oven are monitored to continuously control the process.

11 Claims, 2 Drawing Sheets

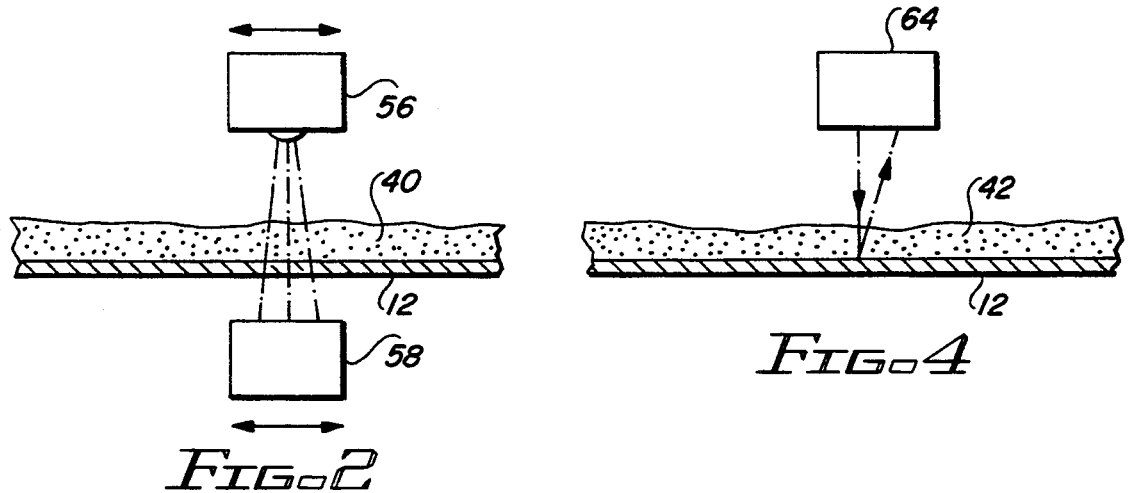
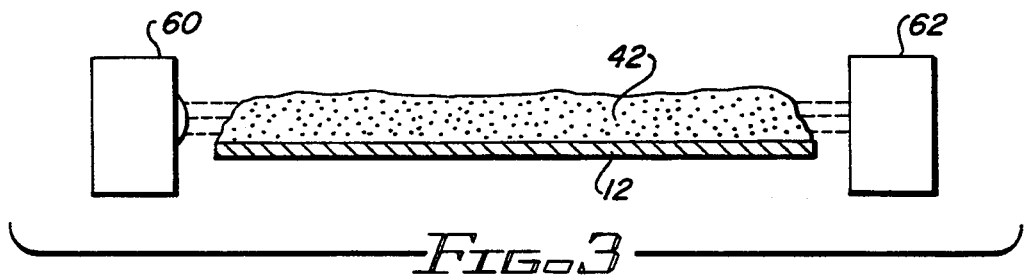
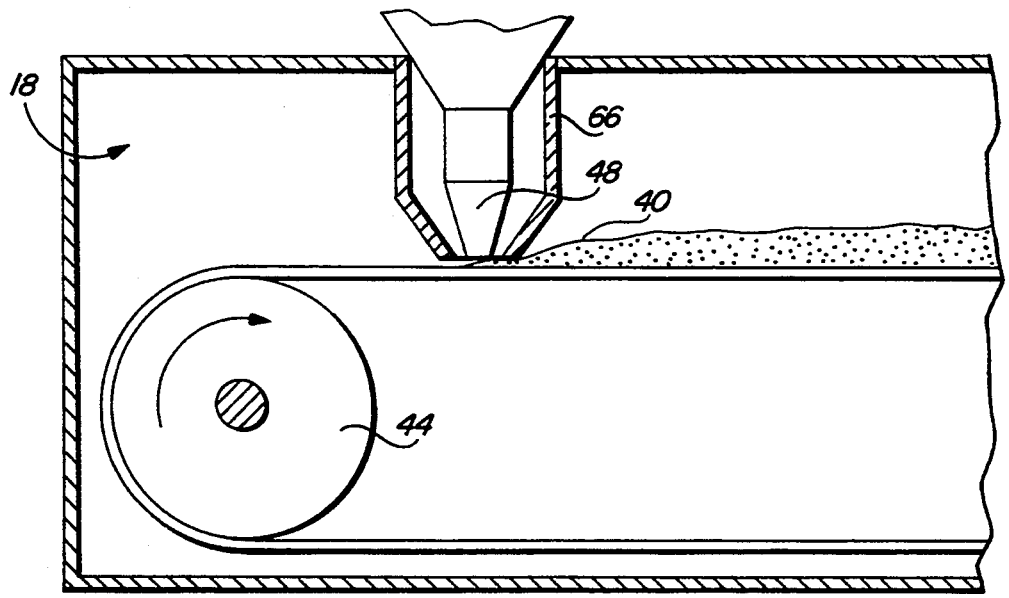

METHOD OF AND APPARATUS FOR CONTINUOUSLY FOAMING A POLYIMIDE POWDER

BACKGROUND OF THE INVENTION

The invention relates to polyimide foams and in particular to a method of and apparatus for continuously foaming a polyimide prepolymer powder that is not susceptible to microwave heating wherein the polyimide prepolymer powder is uniformly heated throughout to form a continuous piece of foam product of relatively uniform cell size, density and strength throughout.

Many foams and especially polyimide foams are produced by batch processes where the prepolymer powder is foamed in a closed or open mold or by the free rise method. As discussed in U.S. Pat. No. 4,780,167, (columns 1 and 2), the foam produced in closed molds tends to be very irregular and lack uniformity of cell size, density and strength. The problems increase when attempts are made to vary the foam product density by varying the amount of precursor placed in the mold. While foaming product under ambient pressure in a free rise process or in open molds produces more uniform cell size and density, it is still difficult to produce foam panels of controlled, varying densities for different applications. In addition, when using batch operations to foam polyimides, it is necessary to use masking materials or release materials to prevent the foam from adhering to the mold contact surfaces and/or the mold contact surfaces must be cleaned between batches. In a free rise batch process as discussed in U.S. Pat. No. 4,305,796, (column 5, line 51), the faces and all four sides of the buns produced in the batch process normally must be trimmed to provide the end product with smooth planer surfaces. This results in trim or scrap losses which increase the cost of the end product.

The '167 patent further discusses the foaming of certain resins between moving endless belts. The patent states that while this method of foaming is apparently effective with polystyrene and polyurethane "this method is not applicable to controlled density polyimide foam because of the much longer periods at much higher temperatures required for polyimides which require excessively long and/or very slowly moving belts operating in a very high temperature oven."

In addition, the heat transfer situation is very different for a polyimide foam when compared to phenolic and polyurethane foams which are formed from ingredients that are much more reactive than the ingredients used to produce polyimide foam. With the phenolic and polyurethane foams, the reactive ingredients are mixed together in a mixing head and are deposited within seconds onto the conveyor where the ingredients react and produce heat. The blowing agent is a volatile compound (such as a chlorofluorocarbon) that has been added to the mixture specifically for blowing. In this process, the oven's heat is used to raise and/or keep the temperatures of the outer surfaces of the foam at the same temperatures as those generated within the foam during the foaming process due to the exotherm of the reacting ingredients.

With polyimide foam, the ingredients react more slowly and the heat from the oven is required to promote the reaction of the ingredients throughout the foam. As the ingredients in the upper portion of the polyimide powder are foamed, the upper foamed portion insulates the lower portions of the ingredients from the hot oven air or infrared radiation thereby retarding the foaming process and producing nonuniform temperatures throughout the thickness of the ingredients being foamed.

U.S. Pat. No. 4,900,761, is directed to a process for producing a polyimide foam wherein "In at least one such stage the precursor is subjected to one or more temperatures sufficient to obtain a consolidated but friable cellular foam structure, and in at least one other such stage this cellular foam structure is subjected to one or more higher temperatures sufficient to cure the cellular material into a resilient polyimide foam. Preferably, these stages are conducted in a continuous manner as by supporting the material being foamed on a moving belt or rotating platform associated with appropriate heating apparatus...". While directed to a continuous process of foaming, the process differs in its approach from the method of the present invention in certain important respects and does not address the need for uniform heating of the ingredients throughout the entire thickness of the materials being foamed by balancing the heat imparted to the foam from above and below by preheating the moving belt. In addition, it does not address the need to rapidly cool the lower surface of the foam product formed so that the foam can be removed from the moving belt before the interior of the foam is completely cool to increase the efficiency of the continuous foaming process.

U.S. Pat. No. 4,855,331, is directed to the production of foamed polymer structures in a batch process which uses microwave radiation to foam precursors that are susceptible to microwave heating. In this batch process microwave radiation is applied to the precursor from above, the sides and the ends of the precursor body. However a shield is placed below the precursor body to curtail radiation directed at the precursor body from below. The shield can be heated to a temperature of between about 50 degrees and about 200 degrees Centigrade (preferably in the range of about 60 degrees to about 130 degrees Centigrade) to raise the temperature of at least the lower portion of the precursor body.

U.S. Pat. No. 4,305,796, is directed to a method of preparing polyimides from precursors which are susceptible to microwave heating in a batch process using microwave radiation. In this batch process the substrate or mold can be preheated to a temperature of about 121 degrees Centigrade to 149 degrees Centigrade.

SUMMARY OF THE INVENTION

The present invention provides a method of and apparatus for continuously foaming a polyimide prepolymer powder of the type that is not susceptible to microwave heating under ambient pressure to produce a polyimide foam product which has more uniform cell size, density and strength throughout. A preheated conveyor belt is utilized to convey a layer of polyimide prepolymer powder through a conventional convection and radiant heat curing oven. Due to the nature of the polyimide prepolymer powder, microwave heating is not utilized in the process. Heat conduction from the conveyor belt into the polyimide prepolymer powder is the main heat source for the polyimide prepolymer powder comprising the lower portion (approximately the lower one half) of the powder layer and especially to the powder contacting and adjacent the upper surface of the conveyor belt. The main heat sources for the upper half of the powder layer are from oven air convection and oven surface infrared radiation.

If the prepolymer powder were spread onto a cold conveyor belt and conveyed into an oven, the upper surface of the prepolymer powder layer would take on heat by convection and radiation and the lower surface of the prepolymer powder layer would be kept relatively cool due to heat conduction by the conveyor belt. The upper portion of the prepolymer powder layer would begin to foam as it is heated by the oven and begin to develop a cellular structure thereby insulating the lower portion of the prepolymer powder layer limiting or retarding the absorption of heat by the lower portion of the prepolymer powder from above. The heating of the lower portion of the prepolymer powder layer would take place from below receiving its heat by conduction from the conveyor belt- However, before the conveyor belt would provide heat to the lower portion of the prepolymer powder, the conveyor belt would have to be heated. Thus, initially the conveyor belt would act as a heat sink retarding the heating of the lower portion of the powder layer. This would affect the comparative cell size, density and strength of the upper and the lower portions of the finished foam product. Since the upper portion of the powder layer would become heated before the lower portion of the powder layer, at some point in the foaming process, the upper portion would be essentially in a stabilized foamed condition, having a developed cellular structure, while the lower portion of the powder layer would still be foaming and developing its cellular structure. This would restrain formation of cells in the lower portion of the powder layer and would cause defects such as, cell collapse and nonuniform cell size. In addition, the upper portion of the foamed product could overheat, turn a darker color and possibly, experience property degradation before the foaming of the lower portion of the powder layer was completed. Thus, the use of the preheated conveyor belt in the continuous process of the present invention greatly improves the overall appearance, performance and quality of the finished product.

In addition to improving the quality of the foamed product produced, the preheating of the conveyor belt speeds up the heat transfer to the prepolymer powder thereby decreasing the time required for foaming the powder. This permits an increase in production line speeds and thus an increase in product output. It is estimated that the use of the heated conveyor belt could increase production speeds by from 50% to 200% depending on the thickness of the product being produced.

The conveyor belt used in the present invention has a high thermal conductivity and a relatively low heat capacity. This permits the conveyor belt to be rapidly preheated and facilitates a rapid heat transfer to the prepolymer powder layer. It also permits the conveyor belt to be rapidly cooled upon exiting the oven to cool the lower surface of the continuous foam bun so that the foam product can be removed from the conveyor belt sooner.

When it is reacted, polyimide precursor powder has good adhesive properties. In batch operations, this necessitates the use of masking materials, release materials and/or the cleaning of the mold contact surfaces between foaming cycles. However, with the continuous process and apparatus of the present invention, after the product is removed from the conveyor belt, the conveyor belt is continuously and automatically cleaned thereby eliminating this labor intensive step of the prior art batch processes. The polyimide cleaned or removed from the upper surface of the conveyor belt can be ground and added to the prepolymer powder being spread on the conveyor belt as it enters the oven, serving as a filler material to further reduce the raw material and production costs.

The process and apparatus of the present invention also include the ability to post cure and/or crush the foam bun produced as part of the continuous process for manufacturing the foam bun. Since the foam bun produced is continuous, the process and apparatus of the present invention eliminate end trim loss that is present in batch operations. These features of the process and apparatus of the present invention reduce the handling of the bun by the process operators and provide a more efficient and cost effective operation than the prior art batch processes.

The continuous process of the present invention is to be controlled by beta gages and/or dielectric meters. However, even if these control means are not used, the continuous process of the present invention still offers control advantages over the batch processes of the prior art. In actual practice, an operator would be better able to make fine adjustments to the process based on a continuous visual assessment of the foam product as the foam product exits the oven or as the product comes off the end of the production line than he could based on an assessment of buns made in a batch process. In a batch process, the prepolymmer powder is segregated into batches, the powder for each bun is laid out in a discrete operation, the oven doors are opened, the oven is charged and the oven is closed. Each of these steps can introduce a variation peculiar to the specific batch. The continuous process of the present invention eliminates many of these potential variables.

The polyimide foam produced by the method and apparatus of the present invention is one that has increased fire retardancy compared to polyurethane foam. The product may be used in confined areas e. g-, aircraft cabins, below decks in ships and in similar applications. In addition, the foam product can be adhered to selected substrates, used between walls or adhesively bonded to the surface of a wall.

A preferred polyimide foam which is not susceptible to microwave heating and which can be produced by the method and apparatus of the present invention has a ratio of imide to amide groups in the final product that is greater than a 1 to 1 ratio, ranging from approximately 1 to approximately 19 imide groups per amide group (as used herein "polyimide foam"). It is a light weight open cell foam having a density of less than 6 pounds per cubic foot and preferably less than 1.0 pounds per cubic foot and greater than 0.20 pounds per cubic foot. It is characterized by the following physical properties: high thermal stability, low shrinkage when exposed to high service temperatures, and low density.

BRIEF DESCRIPTION OF THE DRAWING

FIG. 2 is a cross-sectional view taken substantially along line 2—2 of FIG. 1 to show a beta gage for monitoring the mass of the prepolymer powder layer.

FIG. 3 is a cross-sectional view taken substantially along lines 3—3 of FIG. 1 to show a beta gage for monitoring the density of the foam product exiting the oven.

FIG. 4 is a cross-sectional view also taken substantially along lines 4—4 of FIG. 1 showing a dielectric meter being used to monitor the degree of cure of the foam product exiting the oven.

FIG. 5 is a partial elevation view of the upstream end of the production line showing an alternative way of preheating the conveyor belt.

DETAILED DESCRIPTION OF THE INVENTION

Figure 1:
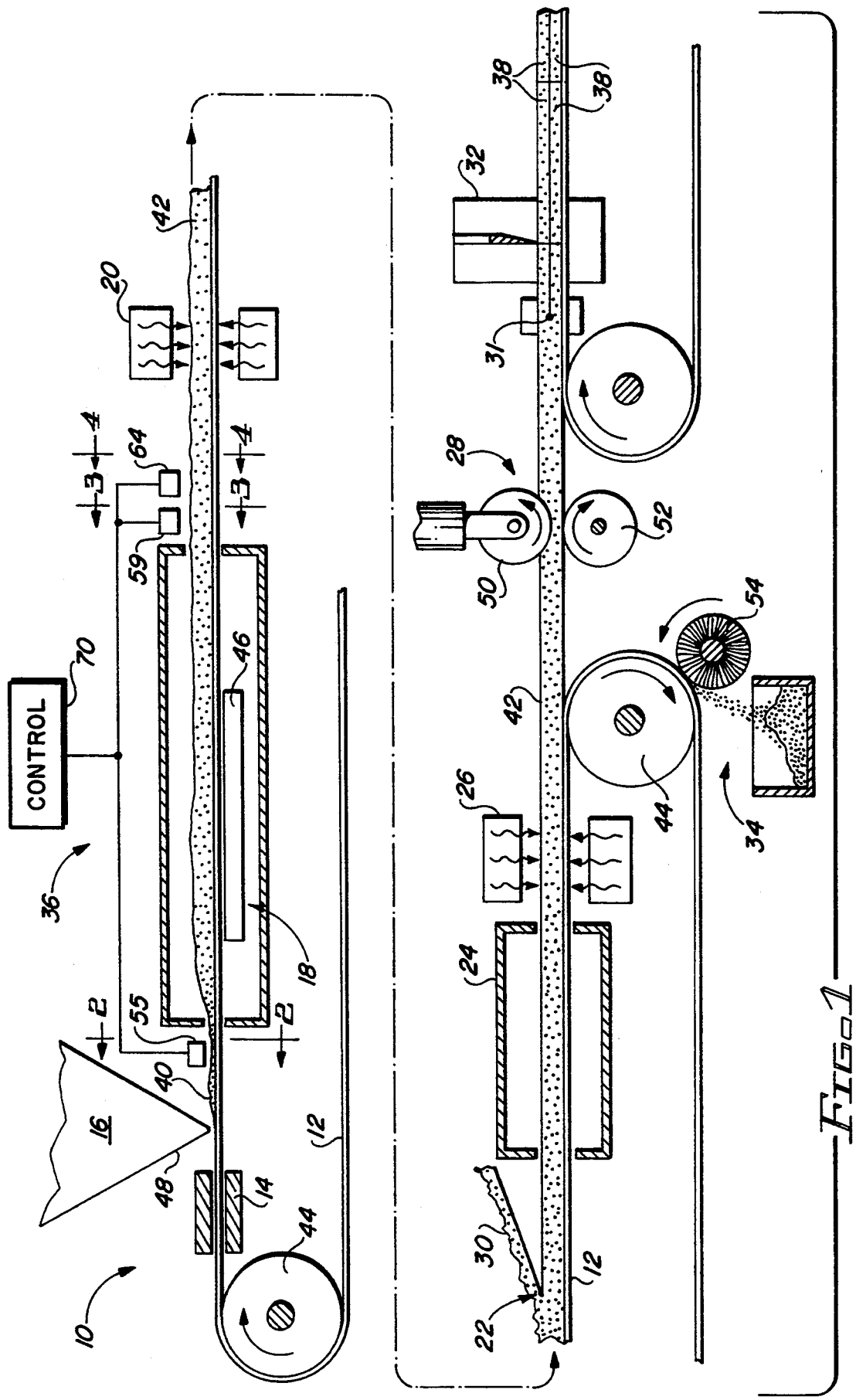
FIG. 1 is a schematic elevation of the apparatus of the present invention illustrating its use in the method of continuously foaming polyimide prepolymer powder under ambient pressure to produce a polyimide foam product.

While the method and apparatus of the present invention are generally applicable to heating a prepolymer powder at ambient pressure to release a blowing agent and continuously form a foamed product, the method and apparatus are especially designed to continuously form a foamed product from a polyimide prepolymer powder which is not susceptible to microwave heating. The method and apparatus of the present invention preferably employ a two stage reaction as described in U.S. Pat. No. 4,980,387, issued Dec. 25, 1990, and entitled Lightweight Flexible Imide Foam and Method of Producing Same and U.S. Pat. No. 4,990,543, issued Feb. 5, 1991, and entitled Lightweight Flexible Foam and Method of Producing the Same, both of which are incorporated herein in their entirety by reference.

The polyimide foam produced in accordance with the method and apparatus of the present invention is generally produced in a two or three step process. A polyisocyanate having at least two functional groups per molecule and a mixture of a difunctional acid and a difunctional anhydride in the presence of a tertiary amine hydrazine catalyst can be used for the reactants. The reactants are blended together and reacted in the absence of a solvent by being heated to approximately 140 to 230 degrees Centigrade. In one or two steps, approximately 10% to 80% and preferably 45% to 75% of the theoretical carbon dioxide available from the ingredients is generated. The reaction mixture is cooled, and ground into a fine prepolymer powder. The prepolymer powder material is further reacted to completion at temperatures of from approximately 200 to 290 degrees Centigrade in a continuous foaming process where the carbon dioxide generation is completed.

As discussed above, in the polyimide foam product produced by the method and apparatus of the present invention, the ratio of the imide groups to amide groups is greater than a 1 to 1 ratio, ranging from approximately 1 to approximately 19 imide groups per amide group. The finished product has a density of less than 6 pounds per cubic foot and preferably between 0.20 and 1.0 pounds per cubic foot.

Referring now to the FIG. 1, an apparatus 10 is shown for carrying out the method of the present invention wherein a prepolymer powder, that is not susceptible to microwave heating, is heated solely by conduction, oven air convection and oven surface radiant heat at ambient pressure to release a blowing agent in a continuous foaming process. In the production of a polyimide foam, the polyimide prepolymer powder, with up to 80% of the theoretical carbon dioxide already released, is the precursor or feed stock for the process.

The continuous foaming apparatus 10 comprises: a conveyor belt 12; a conveyor belt preheating unit 14; a powder feed system 16; an oven 18; a post oven cooling unit 20; a trimming and slicing unit 22; a post curing oven 24; a second cooling unit 26; a crushing unit 28; a slicing station 31; a cut off station 32; and a conveyor belt cleaning device 34. In addition, a monitoring system 36 can be utilized to control the process.

In the manufacture of the polyimide foam product 38, the polyimide prepolymer powder is deposited on the conveyor belt 12 which has been preheated to about 175 to 290 degrees Centigrade. The layer of powder 40 is conveyed through the oven 18 on the conveyor belt where the heat from the preheated conveyor belt 12 and the oven causes the polyimide prepolymer powder to react, foam and form a bun 42. Upon exiting the oven the continuous foam bun 42 is cooled, trimmed, sliced and cut into discrete lengths or, in addition to these process steps, the bun is also subjected to post curing and/or crushing.

The conveyor belt 12 is made of a material having a high thermal conductivity and a relatively low heat capacity so that it can be rapidly heated, will readily transfer its heat to the prepolymer powder and can be rapidly cooled after exiting the oven 18. It is preferred to use conveyor belts made of stainless steel or carbon steel. These materials have the required thermal conductivity, emissivity and heat capacity. In addition, these materials have a high tensile strength and can be operated under tension to keep the conveyor belt 12 flat and tracking correctly. The conveyor belt 12 must be kept flat to produce an acceptably smooth surface on the underside of the foam bun 42 and the finished foam product 38. In use, stainless and carbon steel conveyor belts also resist elongation and damage through abrasion or other factors.

Depending on the thickness of the polyimide prepolymer powder layer 40 and the thickness of the continuous foam bun 42 being produced, the preheated steel conveyor belt 12 may not have sufficient heat capacity by itself to supply the heat required to react the lower portion of the prepolymer powder layer 40. The heat capacity of the conveyor belt 12 can be increased by increasing the thickness of the conveyor belt. However, the thickness of the conveyor belt 12 can only be increased to the point where it will still be flexible enough to bend and pass over the pulleys 44 It is contemplated that belts between 1.0 and 1.2 mm thick will be preferred but that belts ranging from 0.4 to 1.8 mm could perform satisfactorily. Accordingly, for certain product thicknesses, an additional heating unit 46 may be required to supply additional heat to the underside of the conveyor belt 12 as it passes through the oven 18. The heating unit 46 can be a commercially available infrared heater or a contact heater.

The conveyor belt 12 is driven by a conventional variable speed drive system. The speed of the conveyor belt can be controlled by the monitoring system 36 which will regulate the speed to cause the finished foam product to meet certain preselected physical properties.

The conveyor belt preheating unit 14 employs a conventional, commercially available, infrared radiation or convection heating system. The heating system should have sufficient capacity to raise the temperature of the conveyor belt 12 from the ambient temperature surrounding the apparatus 10 to a temperature between 175 and 290 degrees Centigrade at the maximum operating speed of the conveyor belt 12.

After the conveyor belt 12 exits the conveyor belt preheating unit 14 and before the conveyor belt enters the oven 18, the layer 40 of prepolymer powder is laid down on the upper surface of the conveyor belt by the prepolymer powder feed system 16. The powder feed system 16 can be a hopper trough 48 with a screw feed that extends across the width of the conveyor belt 12 and deposits the powder layer evenly to a controlled thickness across the width of the conveyor belt 12. The amount of powder deposited on the conveyor per unit of time is based on the speed of the conveyor 12 and the desired thickness and density of the finished product 38.

The oven 18 is a conventional foaming oven (e.g. gas fired oven) using infrared radiation and convection heating. With a polyimide prepolymer powder, the cellular structure is essentially developed in about 10 minutes and further chemical reaction and stabilization takes place after about an additional 10 minutes. Accordingly, the length of the oven 18 should be sufficient to permit the prepolymer powder layer 40 to have a residence time in the oven of from 10 to 30 minutes depending on the operating speed of the conveyor belt 12.

Upon exiting the oven 18, the continuous polyimide foam bun 42 passes through the post oven cooling unit 20. As the conveyor belt 12 passes through the post oven cooling unit, air is blown on the upper surface of the foam bun 42 and on the underside of the conveyor belt 12 by conventional cooling fans. Since the steel conveyor belt is readily cooled, the cooling air blown against the underside of the conveyor belt 12 rapidly cools down the conveyor belt and the lower surface of the continuous foam bun 42 as the cooling air blown against the upper surface of the continuous foam bun 42 cools the upper surface of the foam bun.

The upper surface and sides of the foam bun 42 must be cooled sufficiently (e.g. below 120 degrees Fahrenheit) to impart sufficient integrity to the foam to permit the skin 30 on the upper surface and sides of the bun to be removed in the trimming operation. By removing the skin 30 that forms on the bun 42 in the oven 18, a smooth finished surface is provided for the end product 38 and better heat transfer to the interior of the bun 42 is achieved in the post curing oven 24 when the bun is being post cured. The skin 30 trimmed from the continuous foam bun can be ground into particles by conventional grinding machines and introduced into the prepolymer powder as a filler to reduce production costs.

As the continuous foam bun 42 exits the post oven cooling unit 20 where it has been cooled, the upper surface and the sides of the foam bun 42 are trimmed by hot wire cutters or ban saws of the trimming unit 22 to remove any rough portions or skin 30. The hot wire cutters or ban saws of the trimming and slicing unit 22 are conventional and commercially available and provide the finished product 42 with smooth planar surfaces. A hot wire cutter such as the Treffner HWC 20—Universal hot wire cutter manufactured by Treffner Engineering can be used to perform the trimming operation. After trimming, the continuous foam bun 42 can be cut into discrete lengths and removed from the conveyor belt 12 as finished product 38 or the foam bun 42 can be post cured in the post curing oven 24. Upon exiting the oven 18, the ingredients of the prepolymer powder are not fully reacted. The post curing of the foam bun 42 is employed to more fully complete the reaction. This results in improved product performance by reducing smoke, weight loss and dimensional changes in the product when it is subjected to high temperatures and it may also improve the dimensional stability of the finished product due to a reduction in internal stresses. The post curing oven 24 is heated by conventional infrared radiation and/or convection heaters and operates at temperatures between about 200 and 315 degrees Centigrade. When post curing is used in the process, the bun 42 is treated in the post curing oven 24 for from 5 to 60 minutes and the post curing oven should be sized accordingly.

When the bun 42 is post cured in the post curing oven 24, the bun is cooled for a second time in the second cooling unit 26. As with the post oven cooling unit 20, in the second cooling unit 26 air is blown on the upper surface of the foam bun 42 and on the underside of the conveyor belt 12 by conventional cooling fans to cool the bun. The surfaces of the continuous bun 42 are cooled to 120 degrees Fahrenheit or less. This prepares the bun for the optional crushing step, the optional slicing step and the cutting step where the bun is cut into discrete lengths.

The foam bun 42 is crushed by passing the bun through the crushing unit 28. The crushing unit comprises two conventionally driven crushing rolls 50 and 52 which have a surface speed equal to that of the bun 42. When the crushing unit is not in use, the upper crushing roll 50 is raised out of the way, e.g. by hydraulic cylinders, so that the bun 42 passes over the lower crushing roll 52 without engaging the upper crushing roll. When the crushing unit 28 is in use, the upper crushing roll 50 is lowered until the peripheral surfaces of the upper and lower rolls 50 and 52 are spaced apart about 85% to 20% of the uncrushed thickness of the bun 42. The spacing of the rolls 50 and 52 relative to each other depends on the degree of crushing desired. The crushing of the bun to a thickness of 85% to 20% of its uncrushed thickness makes the foam more flexible and breaks cell walls to improve acoustic absorption. After the crushing operation, the continuous foam bun regains substantially the thickness the bun had entering the crushing operation.

After passing through the crushing unit 28, the continuous foam bun 42 is sliced into thinner sheets by a hot wire cutter in the slicing unit 31 when thinner sheets are desired and cut into discrete lengths to form the finished product 38 with a hot wire cutter or with a ban saw 26 in the cut off unit 32. A hot wire cutter, such as, the Treffner HWC 20- Universal hot wire cutter manufactured by Treffner Engineering can be used in the slicing unit 31. In the cut off unit 32, a hot wire cutter such as the Treffner HWC 44 Profile and Downcutter, manufactured by Treffner Engineering, offers the advantage of a smoother surface with little or no dust. However, a ban saw is capable of higher cutting speeds and while the surface is not as smooth it is sufficiently smooth for many applications. Once the foam product 38 is cut into discrete lengths, the pieces 38 of foam are removed from the conveyor belt 12 for storage or further processing and the conveyor belt begins its return run to the upstream end of the apparatus 10.

As the conveyor belt 12 passes around the downstream pulley 44 a rotatable driven steel bristled brush 54 of the cleaning unit 34 brushes against the surface of the conveyor belt 12 and removes any polyimide foam adhering to the upper surface of the conveyor belt. This cleans the conveyor belt 12 and prepares the conveyor belt to receive a new layer 40 of prepolymer powder after the belt passes through the preheating unit 14. In addition, the polyimide foam removed from the conveyor belt can be ground and mixed with the prepolymer powder being fed into the distribution trough 48 and used as a filler to reduce raw material costs.

It is contemplated that conventional, commercially available monitoring units 55 and 59 can be used to monitor the mass of the prepolymer powder layer 40 entering the oven 18 and the density of the foam bun 42 exiting the oven 18. FIG. 2 shows the monitoring unit 55 which comprises a beta emitter 56 and a beta detector 58 for monitoring the prepolymer powder layer 40 entering the oven 18. As shown the beta emitter 56 is located above the conveyor belt 12 and the beta detector 58 is located beneath the conveyor belt and directly beneath the beta emitter 56. Thus, the mass of the prepolymer powder layer 40 entering the oven 18 is measured by passing the beta beam vertically through the powder layer from the emitter 56 to the detector 58. The loss of beta particles is directly proportional to the mass between the emitter and the detector. Since the conveyor belt 12 would have a constant mass, variations in the loss of beta particles would be directly related to the mass of the prepolymer powder layer 40 on the conveyor belt 12. The beta gages can be stationary or the gages can be traversed back and forth across the width of the conveyor belt 12 by conventional traversing mechanisms to monitor the entire width of the prepolymer powder layer 40.

FIG. 3 shows the monitoring unit 59 which comprises a pair of beta gages located at the exit of the oven 18 to measure the mass and consequently the density of the foam bun 42 exiting the oven 18. The beta emitter 60 is located on one side of and above the upper surface of the conveyor belt 12 and the beta detector 62 is located on the opposite side of the conveyor belt and directly opposite the beta emitter 60. Thus, the beta beam is directed horizontally across the width of the conveyor belt and through the width of the foam bun 42. As discussed above, the loss of beta particles is directly proportional to the mass between the beta emitter and the beta detector. Thus, for a given width of foam bun 42, the loss of beta particles would be directly proportional to the mass or density of the foam bun 42 and the density of the foam bun can be monitored and compared to the mass of prepolymer powder layer 40 being introduced into the oven 18 to control the process. FIG. 4 shows an arrangement for monitoring the degree of cure of the foam bun 42 exiting the oven 18. As the polypher cures, the molecular linking in the polymer changes and the dielectric properties of the polymer change. Thus, by measuring the properties of microwaves reflected from the interior of the foam polymer bun 42, the degree of cure of the polymer comprising the bun 42 can be determined. In this arrangement, a dielectric meter 64 is positioned above the conveyor belt 12 and emits microwave energy that penetrates the bun 42 and is reflected back to the meter 64 by the foam bun where the characteristics of the reflected microwaves are measured to determine the degree of cure of the polymer in the bun 42.

After appropriate calibration, the beta gages and dielectric meter can relate prepolymer powder input quantities, conveyor belt speeds, and conveyor belt and oven temperatures to desired product densities for buns 42 of various thicknesses. This information can be used as input to a conventional controller which would regulate conveyor belt speed, the amount of prepolymer powder loaded onto the conveyor belt 12, the conveyor belt preheat temperature, the oven temperature or a combination of two or more of these variables to control the properties of the finished foam product.

FIG. 5 shows a second apparatus for preheating the conveyor belt 12 before the prepolymer powder layer 40 is deposited onto the conveyor belt. Instead of having a separate conveyor belt preheating unit 14, the upstream end of the conveyor belt 12 is enclosed in the oven 18. By enclosing the upstream end of the conveyor belt 12 in the oven, the oven 18 provides the heat to preheat the conveyor belt. In this arrangement, the hopper trough 48 is insulated from the heat of the oven 18 by a refractory insulation enclosure 66 to prevent the prepolymer powder from being heated above a temperature of about 40 degrees Centigrade.

In the method of the present invention, prepolymer powder with up to about 80% of the carbon dioxide reacted, is deposited on the conveyor belt 12 from the hopper trough 48 to form a layer 40 of prepolymer powder on the conveyor belt. The conveyor belt 12 has been preheated to between 175 and 290 degrees Centigrade and heat transfer to the lower portion of the prepolymer powder layer 40 from the conveyor belt commences as the conveyor belt 12 conveys the prepolymer powder layer into the oven 18.

Within the oven 18, heat is transferred by infrared radiation and convection to the upper portion of the prepolymer powder layer 40 as heat is transferred to the lower portion of the prepolymer powder layer by conduction from the conveyor belt. The main heat source for the lower one half of the prepolymer powder layer 40 is the heat conducted from the conveyor belt 12 and the main heat source for the upper half of the prepolymer powder layer is by convection and radiation from the oven surfaces. Since the developing cellular structures in the upper and lower portions of the prepolymer powder layer do not form insulating barriers to interfere with the main heat sources for the upper and lower portions of the layer 40, the developed cellular structure of the overall foam bun 42 throughout its thickness is uniform producing an improved product. Should the heat capacity of the preheated conveyor belt 12 be insufficient to provide the required heat to react the ingredients in the lower half of the powder layer additional heat can be provided to the conveyor belt 12 by the auxiliary heating unit 46.

After the continuous foam bun 42 exits the oven 18, the bun is cooled by air in the post oven cooling unit 20. The bun is cooled sufficiently to allow the bun to be trimmed and sliced into sheets by the trimming and slicing unit 22 and, if desired, to be removed from the conveyor belt before the core of the bun 42 has cooled.

After trimming, the continuous bun 42 can be post cured in the post curing oven 24 to improve its performance. As discussed above, the post curing of the bun reduces smoke, weight loss and dimensional changes in the bun when the product is subjected to high temperatures in use. The post cure takes place at temperatures of from 190 to 315 degrees Centigrade and lasts for from 3 to 60 minutes.

After the post cure, the foam bun 42 is again cooled in the second cooling unit 26 by directing air onto the upper surface of the bun and the underside of the conveyor belt 12. Once cooled, the bun 42 can then be subjected to the crushing step by crushing the bun between crushing rolls or cylinders 50 and 52 to improve the flexibility and acoustical properties of the bun or the bun can be merely passed over roll 52 into the slicing and cutting stations 31 and 32.

After the post curing and/or crushing of the bun 42, or if no post curing or crushing of the bun is performed, after the bun has been cooled and trimmed upon exiting from the oven 18, the continuous bun 42 can be sliced into thinner sheets in the slicing station 31 and cut into discrete pieces 38 in the cutting station 32 to form the finished product.

After the conveyor belt 12 transfers the continuous bun 42 to the crushing station 28, the conveyor belt 12 is cleaned by the brush 54 to remove any polyimide foam adhering to the conveyor belt. The particles of polyimide foam removed from the conveyor belt are collected and, if desired, the particles are ground and mixed with the prepolymer powder as a filler to reduce raw material costs. The cleaned conveyor belt returns to the preheating unit 14 or the upstream end of the oven 18 to be heated and prepared to receive the precursor prepolymer powder layer 40 from the powder feed system 16 and the formation of the foam bun 42 continues.

The process control system 36, through the beta gages 56 and 58 which direct a beta beam vertically through the prepolymer powder layer 40 and the beta gages 60 and 62 which direct a beta beam horizontally through the foam bun 42 in a direction across the width of the conveyor belt 12 monitor the mass of the prepolymer powder layer 40 entering the oven 18 and the density of the foam bun 42 exiting the oven 18. The dielectric meter 64 measures the degree of cure of the bun 42 exiting the oven 18. The beta gages and dielectric meter relay this information to a conventional control system 70 which adjusts the amount of prepolymer powder loaded onto the conveyor belt 12; the speed of the conveyor belt 12; the temperature of the preheated conveyor belt 12; the temperature of the oven 18; and/or the heat input of the auxiliary heater 46 to the conveyor belt 12 to control the density and degree of cure of the bun 42 exiting the oven 18. As an alternative, if a less expensive control system is desired, an operator can take readings directly off the beta gages and dielectric meter and make the necessary process adjustments.

In describing the invention certain embodiments have been used to illustrate the invention and the practice thereof. However, the invention is not limited to these specific embodiments as other embodiments and modifications within the spirit of the invention will readily occur to those skilled in the art on reading this application. The invention is not intended to be limited to the specific embodiments disclosed, but is to be limited only by the claims appended hereto.

What is claimed is:

1. A method of continuously foaming a polyimide prepolymer powder comprising:

continuously depositing a prepolymer powder in a continuous layer on a continuous metallic conveyor belt that has been preheated to a temperature of at least 175 degrees Centigrade;

moving the continuous prepolymer powder layer through a heated oven on the continuous metallic conveyor belt;

heating an upper portion of the prepolymer powder layer by oven air convection and infrared radiation and heating a lower portion of the prepolymer powder layer by heat conduction from the metallic conveyor belt to react and foam the prepolymer powder layer to form a continuous piece of foam bun.

2. The method of claim 1 including: cooling the metallic conveyor belt upon exiting the oven to cool a bottom surface of the continuous foam bun and enable the removal of the foam bun from the conveyor belt before an interior portion of the foam bun has cooled.

3. The method of claim 1 including: cooling the continuous foam bun upon exiting the oven sufficiently to permit a skin to be removed from an upper surface of the continuous foam bun; trimming the skin from the upper surface of the continuous foam bun; reheating the continuous foam bun by passing the continuous foam bun through a post curing oven; cooling the continuous foam bun a second time; and cutting the continuous foam bun into discrete lengths to form a foam product.

4. The method of claim 3 including: crushing the foam bun after it has been cooled for the second time and prior to cutting the continuous foam bun into discrete lengths.

5. The method of claim 3 including: grinding the skin removed from the foam bun into particles and adding the particles to the prepolymer powder.

6. The method of claim 1 including: cleaning the conveyor belt after it is no longer in contact with the foam bun and prior to the preheating of the conveyor belt to remove foam from the conveyor belt that has become adhered to the conveyor belt during the curing of the foam bun in the oven.

7. The method of claim 6 including: grinding the foam removed from the conveyor belt into particles and adding the particles to the prepolymer powder.

8. The method of claim 1 including: cooling the continuous foam bun upon exiting the oven and slicing the continuous foam bun into sheets.

9. The method of claim 1 including: measuring the mass of the prepolymer powder layer entering the oven and the density of the continuous foam bun exiting the oven to control the process.

10. The method of claim 1 including: measuring the degree of cure of the continuous foam bun as the continuous foam bun exits the oven.

11. The method of claim 1 wherein: the prepolymer powder is a polyimide prepolymer powder which is not susceptible to heating by microwave energy.

* * * * *